United States Patent [19]

Callens et al.

[11] Patent Number: 4,907,277
[45] Date of Patent: Mar. 6, 1990

[54] METHOD OF RECONSTRUCTING LOST DATA IN A DIGITAL VOICE TRANSMISSION SYSTEM AND TRANSMISSION SYSTEM USING SAID METHOD

[75] Inventors: Paul Callens; Claude Galand, both of Cagnes sur Mer; Guy Platel, Hameaux du Soleil; Robert Vermot-Gauchy, Saint Paul, all of France

[73] Assignee: International Business Machines Corp., Armonk, N.Y.

[21] Appl. No.: 212,121

[22] Filed: Jun. 27, 1988

Related U.S. Application Data

[63] Continuation of Ser. No. 662,925, Oct. 19, 1984, abandoned.

[30] Foreign Application Priority Data

Oct. 28, 1983 [GB] United Kingdom ............ 83430035.2

[51] Int. Cl.$^4$ .............................................. G10L 5/00
[52] U.S. Cl. ......................................... 381/46; 371/31; 375/122
[58] Field of Search ............................ 381/46; 371/31; 375/122

[56] References Cited

U.S. PATENT DOCUMENTS

| | | | |
|---|---|---|---|
| 4,216,354 | 8/1980 | Esteban | 179/15.55 R |
| 4,287,592 | 9/1981 | Paulish | 370/88 |
| 4,291,405 | 9/1981 | Jayant | 371/31 |
| 4,464,783 | 8/1984 | Beraud et al. | 381/31 |
| 4,672,670 | 6/1987 | Wang | 381/47 |

Primary Examiner—Emanuel S. Kemeny
Attorney, Agent, or Firm—John B. Frisone

[57] ABSTRACT

A method of reconstructing, at the receiving end, digital data defining an encoded voice signal segment lost in transmission between the transmitter and the receiver in a transmission system wherein a low-frequency signal such as a residual baseband signal is derived at the transmitting end from the signal to be encoded and is then distributed among several sub-bands whose sampled contents are quantized separately. The reconstruction method includes a step of analyzing the received signal to detect any missing segment thereof and, as the case may be, to initiate an analysis, within each sub-band, of the segment(s) adjacent to the lost segment, so as to generate a term relating to the period $T_{(k)}$ of the signal so analyzed and to reconstruct a segment of signal of period $T_{(k)}$ intended to be substituted for the lost segment. Cyclic redundancy is used to detect errors, and modulo sequence numbering identification is used to detect loss of packet.

18 Claims, 6 Drawing Sheets

METHOD OF RECONSTRUCTING LOST DATA IN A DIGITAL VOICE TRANSMISSION SYSTEM AND TRANSMISSION SYSTEM USING SAID METHOD

This application is a continuation of Ser. No. 662,925 filed Oct. 19, 1984 now abandoned.

DESCRIPTION

TECHNICAL FIELD

This invention relates to the digital transmission of voice signals and, more particularly, to methods for correcting errors due to bits lost in transmission between a transmitter and a receiver.

BACKGROUND ART

In digital transmission systems wherein digital signals are transmitted in the form of groups (packets or blocks) of bits, each group comprises data bits, destination address bits, control bits and/or flag bits delimiting the group. Due to transmission errors or node clipping, a packet or block of bits will occasionally fail to be received or contain errors. In either case, the packet or block of bits may be considered lost.

In some cases, a retransmission may be requested by the receiver, but this is not always feasible. In the particular case of voice transmission systems, operations must be performed in real time or with an extremely small delay, which precludes retransmissions. Other means for recovering or reconstructing the lost bits must therefore be devised. The properties of voice signals may be utilized as a means of facilitating this reconstruction.

The lost bits can be compensated for in the receiver by means of so-called interpolation or extrapolation processes using the bits that were normally received. Lost signal samples are calculated from correctly received samples. The calculated samples are then artificially reintroduced in the signal received by the called party.

The interpolations or extrapolations are governed by a mathematical law of variable complexity which may be linear or parabolic, for example. While imperfect, corrections made in this manner are acceptable to the human ear, provided the lost portion of signal is of short duration. However, this does not hold true if the duration of said lost portion is relatively long, as in the case of systems in which signals are transmitted in the form of packets of bits, with each packet representing, for example, a signal duration of 20 to 40 ms. Consequently, other means of compensating for lost packets must be devised.

Another method of making corrections is described in an article by N. S. Jayant and S. W. Christensen entitled "Effect of Packet Losses in Waveform Coded Speech and Improvements Due to an Odd-Even Sample-Interpolation Procedure" published in IEEE Transactions on Communications, Vol. Com. 2, No. 2, Feb. 81, pp. 101–109. Each packet or block of voice signal samples is divided at the transmitting end into two portions respectively comprising even-numbered samples and odd-numbered samples. The loss of a packet entails the loss of every second sample. The lost packets are then recovered by subjecting the correctly received samples to interpolation process. This leads to interpolating between samples rather than between packets. Unfortunately, this method increases the decoding delays, which is a disadvantage.

BRIEF DESCRIPTION OF THE INVENTION

It is, therefore, the object of the present invention to provide a method of correcting and compensating for errors due to the loss of packets of voice signal samples that is simple, efficient and introduces an additional decoding delay of reduced duration.

The invention applies more particularly to a transmission system using a so-called predictive coding method wherein a low-frequency or baseband signal is derived from the voice signal to be encoded and is subsequently distributed among several sub-bands the contents of which are quantized separately. The method of reconstructing lost data includes the steps of determining the period of the signal received in each sub-band and reconstructing the lost portion of signal in each sub-band so as to maintain its periodicity while avoiding sudden transitions between signals derived from received data and reconstructed ones.

The foregoing and other objects, features and advantages of the invention will be apparent from the following more particular description of a preferred embodiment of the invention, as illustrated in the accompanying drawings.

DETAILED DESCRIPTION OF THE INVENTION

The invention is particularly suitable for use in a transmission system of the type in which voice signals are encoded by means of a so-called voice-excited predictive coder (VEPC). This coder and the corresponding decoder are described in U.S. Pat. No. 4,216,354; in U.S. application No. 485,803 and in a paper by D. Esteban, C. Galand, D. Mauduit and J. Menez entitled "9.6/7.2 kbps Voice-Excited Predictive Coder (VEPC)", presented at a meeting of the ICASSP, Tulsa, Okla., 1978. The contents of said patent, patent application and paper are incorporated herein by reference.

Figure 1A:
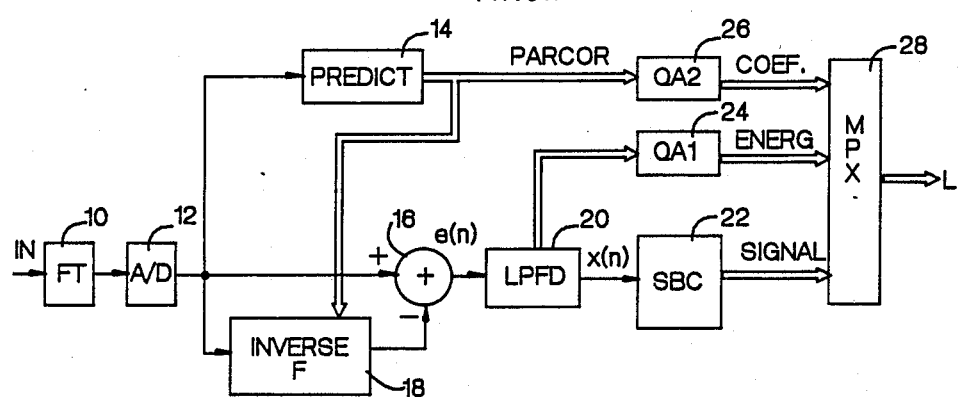
FIGS. 1A and 1B are schematic diagrams respectively showing a prior art transmitter and a prior art receiver that can be used in a system of the type to which the invention is applicable.
Figure 1B:
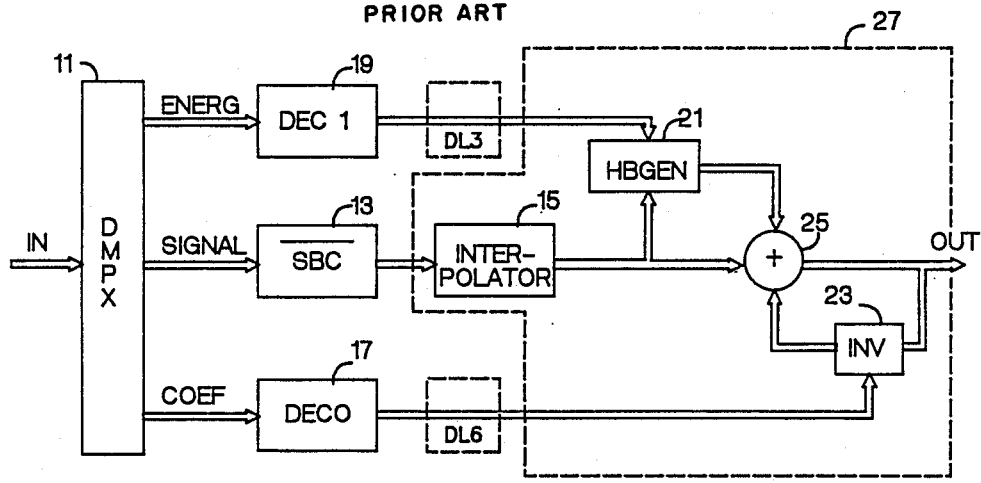

A transmitter incorporating a VEPC, and the corresponding receiver, are shown in FIGS. 1A and 1B, respectively.

The voice signal is applied to input IN of the coder and is passed through a low-pass filter (FT) 10 that feeds a signal the frequency of which lies within the so-called telephone bandwidth (frequencies $\leq 3{,}400$ Hz) to an analog-to-digital (A/D) converter 12, where the signal is sampled at 8 KHz and PCM coded to provide 12-bit samples. These samples are then re-coded by means of so-called Block Companded PCM (BCPCM) techniques. To this end, the output signals from converter 12 are simultaneously applied to a parameter predictor (PREDICT) 14, to a subtractor 16, and to an inverse filter (INVERSE F) 18. Predictor 14 derives from the input signal a group of characteristic coefficients of the voice signal to be processed, in particular so-called partial correlation (PARCOR) coefficients serving to tune inverse filter 18. This filter takes the form of a meshed network of the type defined by J. D. Markel et al. in their book entitled "Linear Prediction of Speech", section 5.4. The output signal from inverse filter 18 is, in fact, representative of the predictable portion of the voice signal. Subtractor 16 subtracts the signal supplied by converter 12 from the output signal of inverse filter 18 and provides a so-called residual signal $e_{(n)}$ from which part of the redundancy of the original voice signal has been eliminated. Residual signal $e_{(n)}$ is passed through a low-pass decimation filter (LPFD) 20. Filter 20 provides, on the one hand, samples $X_{(n)}$ of the low-frequency portion, called residual baseband signal, the spectrum of which is limited, for example, to the range from 300 to 1,000 Hz, of input signal $e_{(n)}$, and, on the other hand, a component representative of the energy of the high-frequency portion thereof eliminated by said filter. The residual baseband signal is then encoded by means of a sub-band coding technique in a device 22 which requantizes the quantization bits in the subbands, using a dynamic allocation technique, and provides a component designated SIGNAL or S. The energy of the high-frequency portion (in the 1,000–3,400 Hz band for example) of the residual signal is requantized in a device (QA1) 24 to provide a component designated ENERG (or E). The PARCOR coefficients are recoded by means of a requantization process in a device (QA2) 26 to provide a component designated COEF (or $K_i$) The three components (COEF, ENERG and SIGNAL) constitute a coded representation that fully characterizes the voice signal applied to the input (IN) of the coder and filtered at 10. The encoded voice signal is sent over a line L by a multiplexer (MPX) 28.

It will be understood by those skilled in the art that, since BCPCM techniques are used in this transmission system, the voice signal is encoded in the form of blocks of samples representing consecutive signal segments, e.g. 20 milliseconds (ms) in duration each.

Parameter predictor 14 is described in detail in aforesaid U.S. Pat. No. 4,216,354 and more particularly in FIGS. 6 and 7 thereof. The method on which the device is based makes use, among others, of algorithms proposed in an article by J. LeRoux and C. Gueguen appearing in IEEE Transactions on Acoustics, Speech and Signal Processing, June 1977.

Device 20 comprises a digital low-pass filter the upper cutoff frequency of which is ≦1,000 Hz. Thus, the residual baseband signal represented by samples $X_{(n)}$ can be re-sampled at 2 KHz. This is done by means of an operation called decimation which consists in periodically dropping certain samples. Device 20 further comprises means for measuring the energy (E) of the high-frequency (1,000–3,400 Hz) portion, eliminated by the low-pass filter, of input signal $e_{(n)}$. An embodiment of device 20 is described in aforementioned U.S. Pat. No. 4,216,354 (see, in particular, FIG. 2 thereof), which includes decimation means for reducing the signal sampling rate to a value smaller than the original one.

Referring now to FIG. 1B, the receiver used to reconstruct the original voice signal at the receiving end of line L is shown. The received signal is processed by a demultiplexer (DMPX) 11 which separates the ENERG, SIGNAL and COEF components thereof from one another. The SIGNAL component is decoded by a decoder (SBC) 13 and is then fed to an interpolator 15 in which an interpolation process intended to bring the signal sampling rate to its original value takes place. In parallel therewith, the COEF and ENERG components are respectively decoded by decoders (DECO) 17 and (DEC1) 19. The output data from interpolator 15 and decoder 19 are fed to a device (HBGEN) 21 which reconstructs the high-frequency band eliminated by filter 20. The coefficients supplied by decoder 17 are used to tune a filter (INV) 23 the output from which is added in an adder 25 to the data supplied by interpolator 15 and device 21. Adder 25 provides the data which, after conversion to analog form (by a device not shown), will reproduce the original uncompressed voice signal, that is, the signal applied to input IN of the coder of FIG. 1A. Dash box 27 encloses that portion of the receiver which is located downstream of decoders SBC13, DEC0 17 and DEC1, 19. Said portion performs synthesizing operations.

The coding and decoding functions described above are carried out by a programmed microprocessor. Note that certain operations such as the filtering operations performed by devices 22 and 13 introduce various delays. To compensate for these, delay lines DL3 and DL6 (shown in dash boxes in FIG. 1B) introducing a 40 ms delay each should be disposed in the paths of the ENERG and COEF data (see DL3 and DL6 in FIG. 8 of above-mentioned U.S. Pat. No. 4,216,354. However, the delay lines could be disposed differently; for example, they could be divided between the transmitter (FIG. 1A) and the receiver (FIG. 1B).

Figure 2:
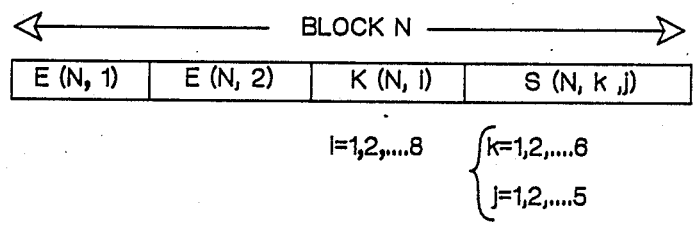
FIG. 2 shows the format of a block of bits generated by the FIG. 1A transmitter.

Referring now to FIG. 2, there is shown the format of the $N^{th}$ block of bits leaving multiplexer 28 and representing a 20 ms segment of encoded voice signal. As shown, the block comprises two 4-bit words ($E_{(N,1)}$) and ($E_{(N,2)}$) representing two energy terms provided over the ENERG channel at the rate of one word every 10 ms. Next come eight PARCOR coefficients $K_{(N,i)}$, with i=1, 2, ..., 8, supplied over the COEF channel by parameter predictor 14 and quantizer $QA_2$ (a total of 28 bits, for example). These are followed by the data sent over the SIGNAL channel, $S_{(N,k,j)}$, where k denotes the rank of the sub-band considered (thus, k=1, 2, ..., 6 since in the system here described by way of example, the bank of SBC filters distributes the signal among six sub-bands), and j=1, 2, ..., 5 denotes the rank of the sample within the block of samples considered. This is due to the fact that we chose to use five samples per sub-band to represent a 20 ms segment of signal.

Accordingly, for the purposes of the invention, the signal samples in the sub-bands will be designated as $S_{(N,k,j)}$.

In practice, the terms $S_{(N,k,j)}$ are BCPCM-coded in the manner proposed by A. Croisier at the International Digital Communications Seminar, Zurich, Switzerland, 1974.

Figure 3:
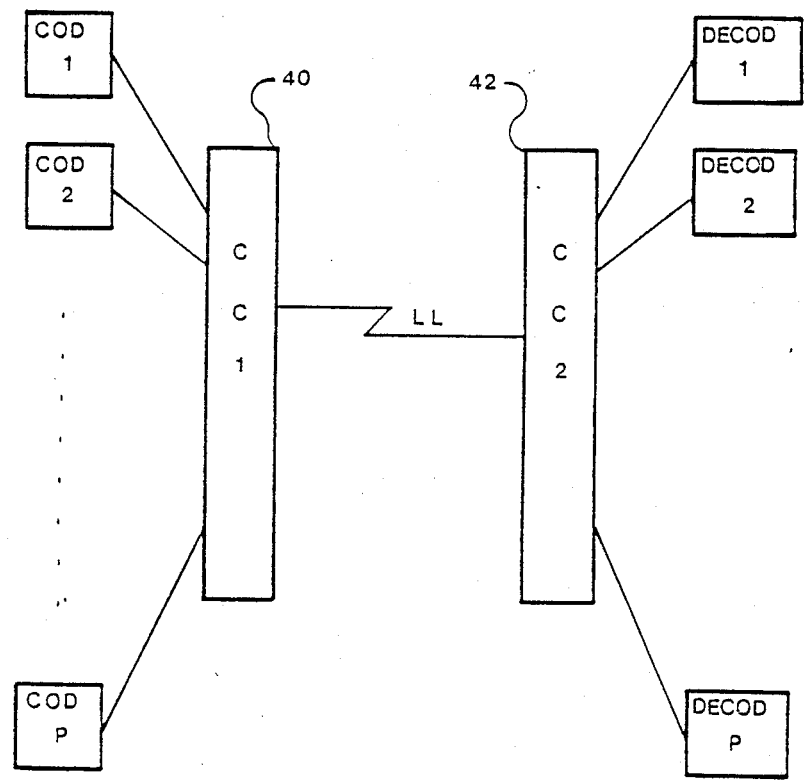
FIG. 3 is a schematic diagram of a digital transmission network of the type to which the invention is applicable.

While applicable to simple point-to-point transmissions, the invention is more particularly suitable for use with a more complex transmission network such as the one schematically shown in FIG. 3. in which P coders are designated COD 1 to COD P. Each of these coders may be of the type shown in FIG. 1A and provides a block of bits similar to that of FIG. 2 every 20 ms. Such blocks of bits are collected by a concentrator or communication controller CC1 40 which assembles them in packets which it then transmits, through a digital channel LL and a communication controller CC2 42, to destination starions attached to decoders DECOD 1 to DECOD P. For present purposes, it is only necessary to observe that communication controller CC1 time compresses each 20 ms block into a block of bits that can be transmitted in 2 ms. CC1 next groups P blocks (one from each coder) or 2P blocks (two from each coder) and adds traffic control bits thereto so as to form a packet (see FIG. 4) that will be sent over line LL, through a modem (not shown) as may be necessary. The delays which, as mentioned earlier, may affect the SIGNAL component can be compensated for by delaying the ENERG and COEF components 20 or 40 ms depending on whether P or 2P blocks are involved. As stated, delay lines divided between the coder of the transmitter (FIG. 1A) and the decoder of the receiver (FIG. 1B) can also be used to that end. The advantage of this solution is that it would make it possible to transmit in the same packet homogeneous blocks, that is, blocks containing ENERG ($E_{(N,1\text{ and }2)}$), PARCOR COEF ($K_{(N,i)}$) and SIGNAL ($S_{N,k,j}$)) components pertaining to the same segment of voice signal rather than to different segments.

Figure 4:
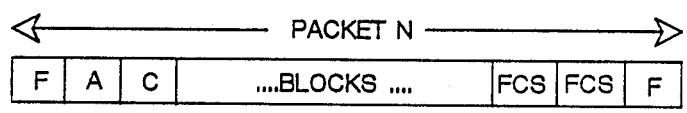
FIG. 4 shows the format of a packet of bits generated by device 40 of FIG. 3.

Referring now to FIG. 4, the $N^{th}$ packet of bits assembled by controller CC1 is shown. The format of this packet is of the HDLC or SDLC type. As such, it begins and ends with a flag (F) byte, say, 01111110. The initial flag byte is followed by:

an address (A) which, if the network is relatively complex and includes many controllers between the coder of the transmitter and the decoder of the receiver, identifies the successive controllers, thereby defining the path to be followed through said controllers;
the number (C) identifying the packet;
the data blocks (BLOCKS) proper; and,
two validity check (FCS) bytes.

At the receiving end, communication controller CC2 42 extracts the bits from the received signal to reconstruct the packets, and then checks the validity of the FCS and identification number of each received packet to detect and drop packets which, due to some transmission error or traffic congestion, are invalid or lost. In the system described herein, such invalid packets are regarded as lost and the data therein must be reconstructed. If the received packet is valid, controller 42 time decompresses each block to bring its duration back to 20 ms before routing it to the appropriate decoder. These operations are conventionally performed in controller 42 by a microprocessor that processes the incoming packets of bits at its own particular rate. Similarly, the microprocessors associated with the various decoders process the incoming blocks of bits at their specific rates. When a decoder has completed processing a block of bits, it requests another from controller 42 by means of an input/output (I/O) request, this being done by raising an interrupt line. Since the processor in controller 42 can only accept the I/O request if and when it is available for that purpose, a lack of synchronism exists between decoders DECOD1-DECODP and controller 42. To prevent losses of data bits, controller 42 includes a buffer or temporary storage (not shown) in which blocks of data decompressed by controller 42 are sequentially stored and from which they will be fetched by each decoder when performing I/O operations. Because of the asynchronous operation of the microprocessors, the contents of the storage fluctuate and for this reason the storage is termed "elastic". As a result, at the time a decoder requests its $N^{th}$ block of bits from controller 42, the elastic storage may or may not contain one or more of the blocks that follow the $N^{th}$ block, i.e. the $(N+1)^{th}$, $(N+2)^{th}$ blocks, etc.

The storage may also contain no $N^{th}$ block or may contain an indication to the effect that the $N^{th}$ block was found to be invalid and was consequently rejected. In such cases, the packet (hence the block) will be considered lost.

In view of the properties of voice signals and the type of coding used herein, the lost blocks problem is solved by reconstructing the lost samples $E_{(N,1)}$, $E_{(N,2)}$, $K_{(N,i)}$ and $S_{(N,k,j)}$ in such a way as to avoid so far as possible distorting or perturbing the received voice signals. Generally, as far as samples $S_{(N,k,j)}$ are concerned, advantage is taken of the fact that the division of the residual baseband signal into narrow sub-bands should leave quasi periodic signals in each sub-band. Accordingly, the period of the signal as defined by the samples in the valid block(s) in the vicinity of the missing block(s) will be determined in each sub-band, and the signal will then be reconstructed so as to make up for the missing block(s) and maintain the periodicity of each sub-band signal.

Figure 5:
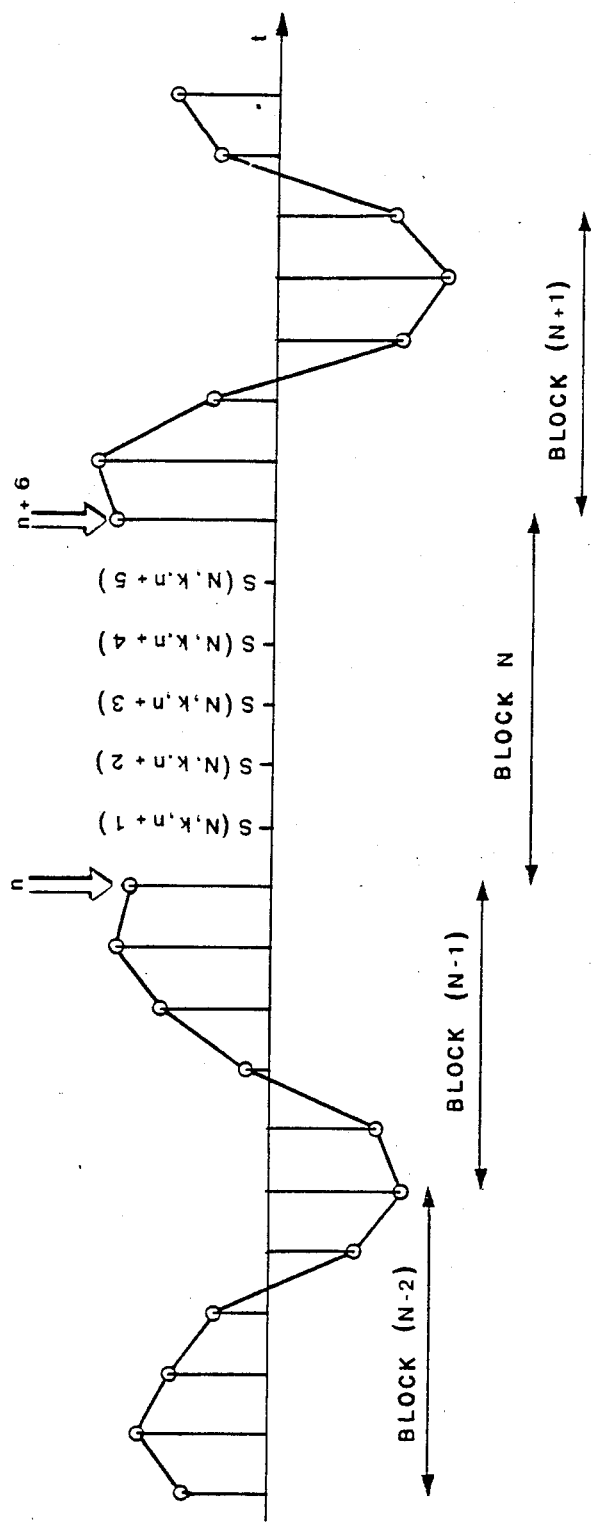
FIGS. 5 and 6 illustrate an embodiment of the invention.

Referring now to FIG. 5, there is shown a sub-band signal one of the blocks of which, block N, identified by means of the number C of the corresponding block or packet (see FIG. 4), is missing. The lost samples are $S_{(N,k,n+1)}$, $S_{(N,k,n+2)}$, $S_{(N,k,n+3)}$, $S_{(N,k,n+4)}$ and $S_{(N,k,n+5)}$. To reconstruct the missing portion of the signal, the period $T_{(k)}$ of the signal represented by blocks $(N-1)$, $(N-2)$, etc., of the sub-band considered ($k^{th}$ sub-band) will first be determined. The missing samples will then be reconstructed. Any of several methods may be used for determining $T_{(k)}$ and reconstructing the lost samples in the $N^{th}$ block, provided the reconstruction method selected does not alter $T_{(k)}$.

Figure 6:
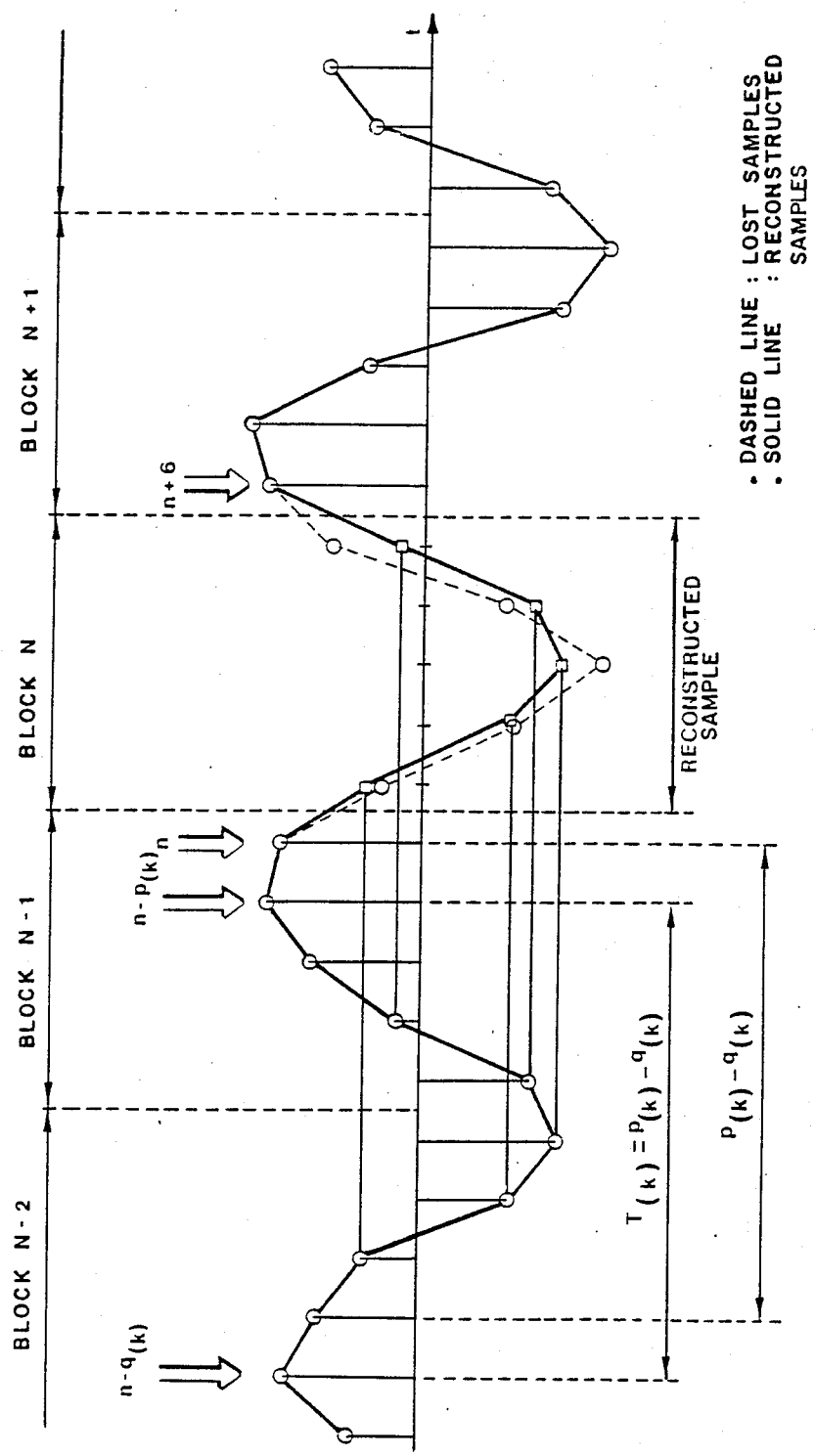

Referring now to FIG. 6, a method suitable for performing these functions is shown. To determine the period $T_{(k)}$, the method examines the samples in blocks $(N-1)$, $(N-2)$, etc., beginning with sample n, so as to determine the peaks nearest the lost block.

Let $n-p_{(k)}$ and $n-q_{(k)}$ be the ranks of the first and second detected peaks, respectively. $T_{(k)}$ can then be determined by calculating the number of samples between said peaks:

$$T_{(k)} = |q_{(k)} - p_{(k)}|$$

The five missing samples are then reconstructed as follows in such a way as not to interfere with the period $T_{(k)}$:

$$S_{(N,k,n+1)} = S_{(N,k,n-T(k))}$$

$$S_{(N,k,n+2)} = S_{(N,k,n-T(k)+1)}$$

$$S_{(N,k,n+3)} = S_{(N,k,n-T(k)+2)}$$

$$S_{(N,k,n+4)} = S_{(N,k,n-T(k)+3)}$$

$$S_{(N,k,n+5)} = S_{(N,k,n-T(k)+4)}$$

The above method of reconstructing missing samples by repeating preceding samples has the advantage of simplicity. However, it creates some problems, particularly with respect to the boundaries between the missing block and the two blocks between which it is located.

These problems are solved as described below. After determining the period $T_{(k)}$ of the sub-band signal by analyzing the blocks that precede one (or two, as will later be seen) missing block(s), the value of $T_{(k)}$ is used to reconstruct the missing samples in a different manner from that described above.

Figure 7:
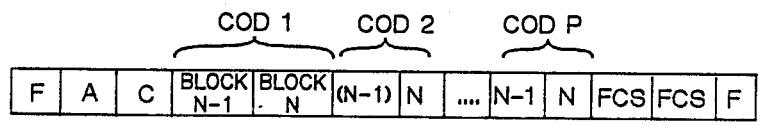
FIG. 7 shows the format of a type of packet of bits used in the transmission network to which the invention is applicable.

It should first be noted that the transmission system in which the invention can be used is designed to transmit packets of the format shown in FIG. 7. This format is the same as that in FIG. 4, except that each coder supplies two consecutive blocks instead of one. However, as will be seen, the invention is not limited to the format shown in FIG. 7 and applies equally well to the format illustrated in FIG. 4. As mentioned earlier, communication controller 42 at the receiving end is provided with a buffer. Thus, when any one of decoders DECOD 1 to DECOD P fetches blocks $N-1$ and $N$ from controller 42, the next blocks, that is, $N+1$, $N+2$, $N+3$, $N+4$, etc., may or may not be stored in the buffer.

In other words, the blocks preceding a pair of lost blocks in a lost packet will be considered available, whereas the next blocks will not necessarily be available. Controller 42 can easily provide an indication of which of these two possible situations exists. All that is necessary to this end is (for example) to compare the contents of the read and write address pointers (not shown) in the buffer. The indication so obtained will enable the samples in blocks of bits pertaining to a lost packet to be reconstructed in different manners, depending on whether the bits in the next packet are or are not available in the buffer.

Assuming that the packet containing blocks $(N+1)$ and $(N+2)$ is lost and that the next packet, i.e. the packet containing blocks $(N+3)$ and $(N+4)$, is not available, a so-called extrapolation process which includes the following operations is carried out for reconstructing:

(1) the ENERG and PARCOR COEF components:
This is done by repeating the last ENERG ($E_{(N,2)}$) and PARCOR COEF components that were correctly received:

$$E_{(N+1,1)} = E_{(N+1,2)} = E_{(N+2,1)} = E_{(N+2,2)} = E_{(N,2)}$$

$$K_{(N+1,i)} = K_{(N+2,i)} = K_{(N,i)} \text{ where } i=1, 2, \ldots, 8.$$

(2) samples $S_{(N,k,j)}$ of the sub-band signal:
As before, one first determines the period $T_{(k)}$ (for $k=1, 2, \ldots, 6$) of the received signal in each sub-band using the last packet(s) correctly received. However, the method used here for calculating $T_{(k)}$ is based upon the zero-crossings of the signal. Accordingly, one solely compares the signs of the received samples, beginning with the samples most recently received. Every change of sign reflects a zero crossing. One counts the number of samples within a time interval corresponding to three zero crossings and $T_{(k)}$ will then assume the value of this number.

Assume that controller 42 permanently retains the three blocks of samples last received. Since each block is comprised of five samples, fifteen samples will be available in controller 42 and $T_{(k)}$ will take on any digital value between 2 and 13. The smaller the value of $T_{(k)}$, the greater the imprecision will be. To overcome this difficulty, if the value initially found is (for example) $T_{(k)} \leq 4$, one counts the number of samples received within a time interval corresponding to five (instead of three) consecutive zero crossings. The possible values of $T_{(k)}$ then become 2; 2,5; 3; 3,5; 4; 5; 6; ...; 13. A value $a_{(k)}$ defined as:

$$a_{(k)} = \cos(2\pi/T_{(k)})$$

is then derived from $T_{(k)}$.

The missing samples, that is, the five samples in the $(N+1)^{th}$ block and the five samples in the $(N+2)^{th}$ block, are obtained as follows:

In the case of the $(N+1)^{th}$ block:

$$S_{(N+1,k,1)} = 2a_{(k)} \cdot S_{(N,k,5)} - S_{(N,k,4)}$$

$$S_{(N+1,k,2)} = 2a_{(k)} \cdot S_{(N+1,k,1)} - S_{(N,k,5)}$$

$$S_{(N+1,k,3)} = 2a_{(k)} \cdot S_{(N+1,k,2)} - S_{(N+1,k,1)}$$

$$S_{(N+1,k,4)} = 2a_{(k)} \cdot S_{(N+1,k,3)} - S_{(N+1,k,2)}$$

$$S_{(N+1,k,5)} = 2a_{(k)} \cdot S_{(N+1,k,4)} - S_{(N+1,k,3)}$$

In the case of the $(N+2)^{th}$ block $$S_{(N+2,k,1)} = 2a_{(k)} \cdot S_{(N+1,k,5)} - S_{(N+1,k,4)}$$

$$S_{(N+2,k,2)} = 2a_{(k)} \cdot S_{(N+2,k,1)} - S_{(N+1,k,5)}$$

$$S_{(N+2,k,3)} = 2a_{(k)} \cdot S_{(N+2,k,2)} - S_{(N+2,k,1)}$$

$$S_{(N+2,k,4)} = 2a_{(k)} \cdot S_{(N+2,k,3)} - S_{(N+2,k,2)}$$

$$S_{(N+2,k,5)} = 2a_{(k)} \cdot S_{(N+2,k,4)} - S_{(N+2,k,3)}$$

From the foregoing, it is seen that the two samples nearest the lost sample are used to reconstruct the latter.

Note that this method would enable the missing samples to be exactly reconstructed if the sub-band signals were perfect sine waves. In practice, however, the sub-band signals correspond to harmonics of the pitch and retain a quasi sinusoidal characteristic as far as the voice signals are concerned.

Assuming now that the packet containing blocks $(N+1)$ and $(N+2)$ is lost and that the next packet is available, a so-called interpolation process which includes the following operations is carried out for reconstructing:

(1) the ENERG components:
An average energy variation factor $\Delta E$ based on the known values of the energy components that are nearest in time to the lost packet is determined:

$$\Delta E = [E_{(N+3,1)} - E_{(N,2)}]/5$$

The energy components for the lost blocks are then calculated:

$$E_{(N+1,1)} = E_{(N,2)} + \Delta E$$

$$E_{(N+1,2)} = E_{(N+1,1)} + \Delta E$$

$$E_{(N+2,1)} = E_{(N+1,2)} + \Delta E$$

$$E_{(N+2,2)} = E_{(N+2,1)} + \Delta E$$

An enhanced acoustical quality of the result will be obtained by coding the energy terms according to a logarithmic scale in the above expressions. These terms are in fact provided in a logarithmic form in the coder/decoder described in aforementioned U.S. Pat. No. 4,216,354.

(2) the PARCOR COEF components:

One first determines the average variation $\Delta K$ defined as $$\Delta K_i = [K_{(N+3,i)} - K_{(N,i)}]/3$$

where $i = 1, 2, \ldots, 8$.

The two desired sets of PARCOR coefficients are then obtained by performing the following operations:

$$K_{(N+1,i)} = K_{(N,i)} + \Delta K_i$$

$$K_{(N+2,i)} = K_{(N+1,i)} + \Delta K_i$$

(3) the samples $S(N+1,k,j)$ and $S(N+2,k,j)$ of the sub-band signals:

As before, one first determines the period $T_{(k)}$ of the known signal in each sub-band. However, in this instance, two values of $T_{(k)}$, namely, $T_{1(k)}$, relating to the packet preceding the lost packet, and $T_{2(k)}$, relating to the packet following the lost packet, must be determined.

One calculates:

$$f_{1(k)} = 1/T_{1(k)} \text{ and } f_{2(k)} = 1/T_{2(k)}$$

hence $$1/T_{(k,p')} = f_{(k,p')} = f_{1(k)} + p' \cdot \frac{f_{2(k)} - f_{1(k)}}{11} \quad (1)$$

where $p' = 1, 2, \ldots, 10$.

Therefore, $f_{(k,p')}$ may be regarded as a theoretical frequency of the lost signal in the sub-band of order k, and permits defining a term $T_{(k,p')} = 1/f_{(k,p')}$.

One then calculates the terms $a_{(k,p')} = \cos(2\pi f_{(k,p')})$.

The terms $a_{(k,p')}$ are used to reconstruct the lost samples as follows:

$$S_{(N+1,k,1)} = 2a_{(k,1)} \cdot S_{(N,k,5)} - S_{(N,k,4)}$$

$$S_{(N+1,k,2)} = 2a_{(k,2)} \cdot S_{(N+1,k,1)} - S_{(N,k,5)}$$

$$S_{(N+1,k,3)} = 2a_{(k,3)} \cdot S_{(N+1,k,2)} - S_{(N+1,k,1)}$$

$$S_{(N+1,k,4)} = 2a_{(k,4)} \cdot S_{(N+1,k,3)} - S_{(N+1,k,2)}$$

$$S_{(N+1,k,5)} = 2a_{(k,5)} \cdot S_{(N+1,k,4)} - S_{(N+1,k,3)}$$

$$S_{(N+2,k,1)} = 2a_{(k,6)} \cdot S_{(N+1,k,5)} - S_{(N+1,k,4)}$$

$$S_{(N+2,k,2)} = 2a_{(k,7)} \cdot S_{(N+2,k,1)} - S_{(N+1,k,5)}$$

$$S_{(N+2,k,3)} = 2a_{(k,8)} \cdot S_{(N+2,k,2)} - S_{(N+2,k,1)}$$

$$S_{(N+2,k,4)} = 2a_{(k,9)} \cdot S_{(N+2,k,3)} - S_{(N+2,k,2)}$$

$$S_{(N+2,k,5)} = 2a_{(k,10)} \cdot S_{(N+2,k,4)} - S_{(N+2,k,3)}$$

To summarize, whether or not the packet that follows a lost packet to be reconstructed is available, the samples in the lost block(s) are reconstructed in such a manner as to maintain the periodicity $(T_{(k)})$ of the signal in each sub-band. For example, every lost sample can be reconstructed from the weighted sum of a predetermined number of samples preceding it, said sum being weighted by using, in particular, a coefficient that is a function of $T_{(k)}$.

In practice, an equation such as Eq. (1) above can be used to perform a linear interpolation of the terms $a_{(k)}$, directly thereby reducing the amount of computation to be performed by the device implementing the invention.

Also, the transitions between a reconstructed block and the next block correctly received can be improved by providing a transition zone at the beginning of said next block. This zone can be used, for example, for weighting the received samples and the reconstructed ones before combining them to determine the sample values to be used. The computing power required to implement the invention could be reduced by combining the above methods, and in particular by processing the SIGNAL ($S_{(N,k,j)}$) component without regard to the presence or absence of the block (or packet) following the invalid one. That is, one would always assume that said block (or packet) is not available, and extrapolate from the preceding block(s).

Figure 8:
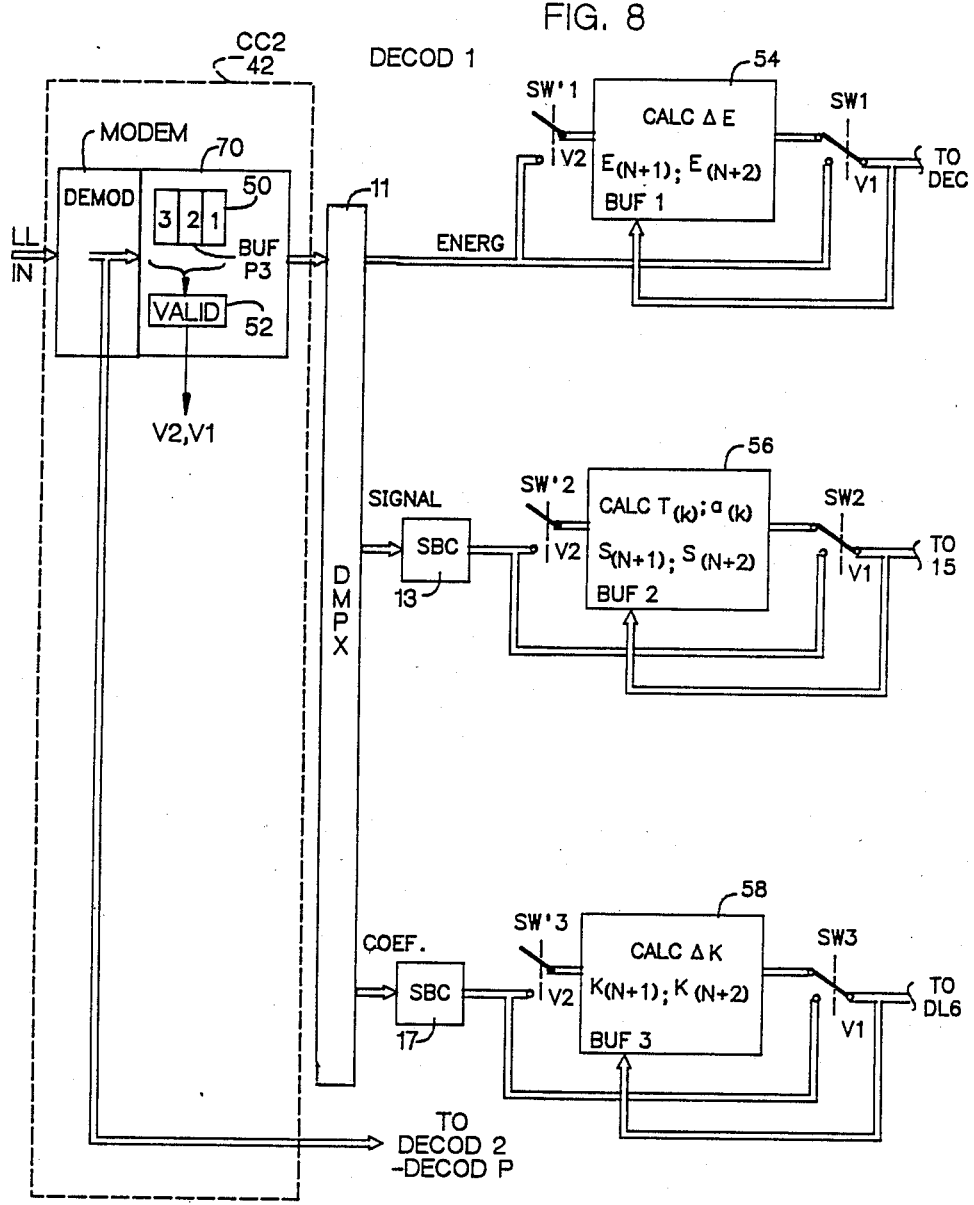
FIG. 8 is a schematic diagram of a receiver embodying the invention.

Referring now to FIG. 8, a schematic drawing of a receiver embodying the invention is shown. This receiver comprises a device similar to the one shown in FIG. 1B, modified in accordance with the invention to enable blocks of lost samples to be reconstructed.

The signal received by communication controller "(CC2)50" is first demodulated in a modem. This modem, representing an input means, supplies the bits to be assembled in packets (see FIGS. 4 and 7) to a signal-processing microprocessor 70 that includes a buffer (BUFP3) 50 storing a given number of incoming packets. The validity of the contents of the packets is determined by a device (VALID)52. More specifically, device 52 checks the identification number of each packet to ensure that it is not received out of sequence, and the validity of the data within the received packet. Any invalid packet so detected is identified by means of a logic signal (V1=0) and rejected. The data in the invalid packet must therefore be reconstructed. Microprocessor 70 also manages the distribution of the contents of each valid packet among decoders DECOD 1 to DECOD P. That is, microprocessor 70 routes the blocks of data to the appropriate decoders.

The voice signals are reconstructed in the decoders DECOD 1 to P that correspond to the voice channel considered. Only the first decoder (DECOD1) has been shown in FIG. 8. The data blocks (see FIG. 2) for decoder DECOD 1 are fed to demultiplexer (DMPX)11 which separates the data relating to the ENERG, COEF and SIGNAL components from one another. It will be assumed that at the time considered the packet containing blocks (N+1) and (N+2) was fed to DECOD 1. If this packet is valid, then the operations to be performed will be the same as those carried out by the decoder of FIG. 1B, except that the terms in the last valid block(s) will also be retained for subsequent use in reconstructing lost blocks, as necessary.

However, if the received packet of bits is invalid and must be reconstructed, reconstruction devices 54,56 and 58 are operated through the use of switches controlled by logic signals V1 and V2 to be described later. Devices 54,56 and 58 perform the operations described earlier to generate terms representing the ENERG, PARCOR COEF components and the sub-band signal samples for blocks (N+1) and (N+2) assumed to be lost.

Device 52 checks the validity of the received packets and generates a logic signal V=1 whenever a packet is valid. The validity of a packet is determined by means of the elements (A, C, FCS) between which the data proper are located. For present purposes, an invalid packet will be considered lost. In FIG. 8, the packets fed to buffer 50 have been numbered 1, 2, 3, etc., in the order in which they were received. Also, the logic signals or validity bits for packets 1 and 2 have been designated V1 and V2, respectively. In this example, packet 1 stored in buffer 50 is the one that contains blocks (N+1) and (N+2) to be processed.

Device 54, which processes the ENERG components, includes a buffer BUF 1 storing the terms $E_{(N,1)}$ and $E_{(N,2)}$ of the block preceding the block to be processed. Devices 54, 56, 58 are provided with means for determining whether BUFP3 already contains the packet that follows the packet to be processed, that is, the one following blocks (N+1) and (N+2), and whether these blocks are valid. If negative answers to both questions are obtained, then the ENERG components for blocks (N+1) and (N+2) are determined by extrapolating from the ENERG components for block (N), as has been seen. However, if positive answers are obtained, then the ENERG components are determined by interpolating between blocks (N+3) and (N) after calculating the term $\Delta E$. Note that, in FIG. 8, the switches controlled by V1 and V2 are shown in the positions corresponding to V1=0 and V2=0.

When V1=1, that is, when the packet to be processed is valid, the decoder acts in the same manner as the decoder of FIG. 1B, except that the ENERG, SIGNAL and COEF components for the blocks considered are stored in buffers BUF 1, BUF 2 and BUF 3, respectively.

When V1=0, the switches SW1, SW2, SW3 are moved to the position shown in which they are connected to the outputs of reconstruction devices 54, 56 and 58. The operation of the devices is then dependent on V2, hence on the validity (or presence) of the packet containing blocks (N+3) and (N+4). If V2=0, an extrapolation is performed, using the expressions given earlier, to reconstruct the lost blocks. If V2=1, then an interpolation is made, using expressions also given earlier.

The operation of devices 56 and 58 is similar to that of device 54, except that they process decoded terms instead of directly processing the terms supplied by demultiplexer 11. Thus, the SIGNAL component passes through decoder $\overline{SBC}$ 13 before it is fed to device 56. Similarly, the COEF components are decoded in decoder DECO (17) before they are fed to device 58.

All that is required to complete the receiver of the invention is to combine the schematic drawings in FIGS. 8 and 1B and to connect the outputs of SW1, SW2 and SW3 to the inputs of decoder DEC1 (19), interpolator 15, and delay line DL6, respectively.

While the invention has been particularly shown and described with reference to a preferred embodiment thereof, it will be understood by those skilled in the art that numerous changes in form and detail may be made therein without departing from the spirit and scope of the invention.

What is claimed is:

1. A method of reconstructing lost data in a digital voice transmission system wherein a low-frequency signal is derived at the transmitting end from the voice signal to be encoded and is then distributed among a plurality of sub-bands whose sampled contents are individually quantized, said method being characterized in that it includes at the receiving end the steps of: analyzing the signal received to identify the lost data;
   analyzing within each sub-band previously received valid data received to determine a term $T_{(k)}$ relating to the period of the signal therein (with k denoting the rank of the sub-band considered); and,
   reconstructing the lost signal in such a way as to maintain the periodicity $T_{(k)}$ of the signal in said sub-band.

2. A method of reconstructing lost data in a digital voice transmission system wherein a residual baseband signal is derived at the transmitting end from the voice signal to be encoded and is then distributed among a plurality of sub-bands whose sampled contents are individually quantized, said method being characterized in that it includes the steps of:
   analyzing the signal received to identify the lost data;
   analyzing within each sub-band previously received valid data to determine a term $T_{(k)}$ relating to the period of the signal therein (with k denoting the rank of the sub-band considered); and,
   reconstructing the lost signal in such a way as to maintain the periodicity $T_{(k)}$ of the signal in said sub-band.

3. A method of reconstructing lost data according to claim 1, characterized in that said analyzing step is performed in each of said sub-bands by determining successive peaks having the same sign.

4. A method of reconstructing lost data according to claim 2, characterized in that said analyzing step is performed in each of said sub-bands by determining successive peaks having the same sign.

5. A method of reconstructing lost data in accordance with claim 1, 2, 3 or 4, characterized in that said analyzing step performed in each sub-band includes the steps of:
   examining the valid samples that were received and immediately precede the lost samples in order to determine at least the two peaks nearest said lost samples; and,
   calculating the number of samples between said peaks, said number defining said period $T_{(k)}$ 6. A method of reconstructing lost data according to claim 5, further characterized in that the lost signal in each of said sub-bands is reconstructed by repeating said validly received samples located between said consecutive peaks to maintain said period $T_{(k)}$ thereof.

7. A method of reconstructing lost data in a BCPCM-type digital voice transmission system wherein a low-frequency signal is derived at the transmitting end from the voice signal to be encoded and is then distributed among a plurality of sub-bands which are individually processed to quantize the samples contained therein and assemble same in blocks (or packets) representing each a voice signal segment of predetermined duration, said method being characterized in that it includes the steps of:
   analyzing the received blocks of samples to detect valid blocks;
   sequentially storing in a buffer a predetermined number of valid blocks;
   identifying the lost block(s);

analyzing within each sub-band the stored valid block(s) immediately preceding the lost block, to determine a term $T_{(k)}$ called period of the signal in the sub-band of rank k; and, reconstructing the signal in each sub-band by constructing a signal of period $T_{(k)}$, with k denoting the rank of the sub-band considered.

8. A method of reconstructing lost data in a BCPM-type digital voice transmission system wherein a low-frequency signal is derived at the transmitting end from the voice signal to be encoded and is then distributed among a plurality of sub-bands which are individually processed to quantize the samples contained therein and assemble same in blocks representing each a voice signal segment of predetermined duration, said method being characterized in that it includes the steps of:

analyzing the received blocks of samples to detect valid blocks;

sequentially storing in a buffer a predetermined number of valid blocks;

identifying the lost block(s);

analyzing within each sub-band the stored valid block(s) immediately preceding and immediately following the lost block, to determine a term $T_{(k)}$, with k denoting the rank of the sub-band considered; and, reconstructing the signal in each sub-band by constructing a signal of period $T_{(k)}$, with k denoting the rank of the sub-band considered.

9. A method according to claim 7, characterized in that said step of reconstructing a signal of period $T_{(k)}$ is performed by repeating the samples of the block(s) immediately preceding the lost block(s) in the sub-band considered.

10. A method according to claim 7 or 8, characterized in that said step of reconstructing the sub-band signal is performed by determining every lost sample from the weighted sum of a predetermined number of samples preceding said lost sample, said sum being weighted by using a coefficient $a_{(k)}$ which is a function of $T_{(k)}$.

11. A method according to claim 10, characterized in that said coefficient $a_{(k)}$ is defined as:

$$a_{(k)} = \cos(2\pi/T_{(k)})$$

12. A method according to claim 10 characterized in that said theoretical period is defined as:

$$T_{(k,p')} = 1/f_{(k,p')}$$

where $f_{(k,p')} = f_1(k) + p' \frac{f_2(k) - f_1(k)}{11}$ $p' = 1, 2, \ldots 10$ and $f_1(k) = 1/T_{1(k)}$ $f_2(k) = 1/T_{2(k)}$ $T_{1(k)}$ and $T_{2(k)}$ being the periods of the signals in the sub-band of rank k, said periods being respectively determined from the blocks of samples that precede and follow the lost block.

13. A method according to claim 12 wherein said predictive coding provides, in addition to the residual baseband signal, a term relating to the energy of the high-frequency band of the voice signal as well as characteristic parameters of said voice signal, said method being characterized in that the parameters and the energy terms relating to the lost data are reconstructed at the receiving end by extrapolating from previously received data.

14. A method according to claim 12 wherein said predictive coding provides, in addition to the residual baseband signal, a term relating to the energy of the high-frequency band of the voice signal as well as characteristic parameters of said voice signal, said method being characterized in that the parameters and the energy terms relating to the lost data are reconstructed at the receiving end by interpolating from valid data preceding and following the lost data.

15. A digital voice transmission system for transmitting voice signals from a transmitter that processes the voice signal to provide segments having a predetermined duration, each segment providing a block of bits containing a term (ENERG) relating to the energy of the signal within a high-frequency band, characteristic coefficients (COEF) of the voice signal to be transmitted, and a term (SIGNAL) relating to the contents of a low-frequency band of said voice signal to be transmitted, said SIGNAL term being processed within sub-bands of the low-frequency band, and means of transmitting said block to a receiver, said receiver reconstructing the voice signal from the ENERG, COEF and SIGNAL terms contained in each received block of bits, said receiver being characterized in that it includes:

input means that process the received signal for reconstructing each block of bits;

buffer connected to said input means and storing at least one block of bits;

validity checking means connected to said buffer means for checking the validity of blocks received and identifying lost blocks;

means connected to said validity checking means and said buffer means for determining, for each sub-band, a term $T_{(k)}$ relative to the period of the signal contained in the sub-band considered;

means for reconstructing lost blocks from the blocks in the vicinity thereof, said reconstructing means connected to said means of determining $T_{(k)}$ for reconstructing a sub-band signal of period $T_{(k)}$, said reconstructing means processing the ENERG, COEF and SIGNAL terms separately; and, synthesizing means connected to said means for reconstructing lost blocks and to said buffer means for providing the received voice signal.

16. A DSI-type of digital voice transmission system wherein voice signals are transmitted as packets containing each at least one block of bits from each active source of voice signal, each block containing a term relating to the energy (ENERG) of the voice signal, coefficients (COEF), and a term representing a low-frequency signal called residual baseband signal, said term being processed within sub-bands of said residual baseband signal, said transmissions system being characterized in that it includes at the receiving end:

input means that process the received signal for reconstructing each block of bits;

buffer means connected to said input means and storing at least one block of bits;

validity checking means connected to said buffer means for checking the validity of blocks received and identifying lost blocks;

demultiplexing means connected to said buffer means for separating the ENERG, COEF, and SIGNAL terms from one another;

means connected to said validity checking means and said buffer means for determining, for each sub-band, a term $T_{(k)}$ relative to the period of the signal contained in the sub-band considered;

reconstruction means connected to said demultiplexing means and to said validity checking means for reconstructing lost packets, said reconstruction means further connected to said means of determining $T_{(k)}$ reconstructing a sub-band signal of period $T_{(k)}$, said packet reconstructing means processing the ENERG, COEF and SIGNAL terms separately; and, synthesizing means connected to said reconstructing means and to said demultiplexing means.

17. A transmission system according to claim 14 or 15, further characterized in that said means of reconstructing said ENERG, COEF and SIGNAL terms employ a so-called extrapolation process.

18. A transmission system according to claim 15 or 16, further characterized in that said reconstruction means employ a so-called interpolation process that makes use of blocks adjacent to the lost block.

* * * * *